United States Patent [19]

Baker et al.

[11] 3,750,278

[45] Aug. 7, 1973

[54] PRINTED CIRCUIT BOARD WITH THROUGH CONNECTION AND METHOD AND MACHINE FOR MAKING THE THROUGH CONNECTION

[75] Inventors: Donald J. Baker, Williamsville, N.Y.; Stanley J. Gartner, Emporium, Pa.; Robert S. Oberg, Kenmore, N.Y.

[73] Assignee: Sylvania Electric Products, Inc., Buffalo, N.Y.

[22] Filed: July 17, 1970

[21] Appl. No.: 62,772

Related U.S. Application Data

[62] Division of Ser. No. 813,514, April 4, 1969, abandoned.

[52] U.S. Cl. ........................ 29/628, 29/625, 174/68.5

[51] Int. Cl. ............................................. H05k 3/00

[58] Field of Search .................... 29/628, 630 C, 432

[56] References Cited

UNITED STATES PATENTS

| | | | |
|---|---|---|---|
| 2,275,438 | 3/1942 | Hothensall | 29/432 |
| 2,854,074 | 9/1958 | Frank et al. | 174/94 R X |
| 3,015,884 | 1/1962 | Chamberlain | 29/432 X |
| 3,191,273 | 6/1965 | Gwyn, Jr. | 29/630 C |
| 3,537,162 | 11/1970 | Koonan | 29/630 C |
| 3,494,029 | 2/1970 | Thielgaard | 29/432 X |

*Primary Examiner*—Charles W. Lanham

*Assistant Examiner*—Joseph A. Walkowski

*Attorney*—Norman J. O'Mally, Edward J. Coleman et al.

[57] ABSTRACT

A printed circuit board having a through connected between conductors on opposite sides of the board which is provided by a conductive element press-fitted in a hole extending through the conductors and insulating material of the circuit board and peened at both ends. The conductive element is inserted into the printed circuit board by punching a hole in the board at a predetermined receiving position, positioning conductive stock material between the retracted punch and the hole, positioning an anvil to enclose the hole on the side of the board opposite that facing the punch, and actuating the punch to remove the conductive element from the stock material, press the element into the hole and peen the element in one stroke. A machine for inserting the conductive element into the printed circuit board comprises a mechanism for holding and indexing the printed circuit board, a punch, a reel supported on one side of the punch and upon which a strip of the conductive stock material is wound, a punch head including a stripper and die assembly in registry with the punch and within which conductive strip material supplied by the reel is slidably retained, a mechanism for indexing the strip material, a female die in registry with the punch on the side of the circuit board opposite that facing the punch and adapted to be laterally shifted so as to function as an anvil with respect to said punch, and a cammed disk having three cam surfaces for actuating said punch, punch head and shiftable die through appropriate followers and linkages.

4 Claims, 33 Drawing Figures

INVENTORS
DONALD J. BAKER, STANLEY J. GARTNER,
ROBERT OBERG
BY
Edward Coleman
AGENT INVENTORS
D. J. BAKER, STANLEY J. GARTNER,
ROBERT OBERG
BY
Edward J. Coleman
AGENT INVENTORS
DONALD J. BAKER, STANLEY J. GARTNER,
ROBERT OBERG
BY
Edward J. Coleman
AGENT INVENTORS
DONALD J. BAKER, STANLEY J. GARTNER,
ROBERT OBERG
BY Edward J. Coleman
AGENT

*INVENTORS*
D.J. BAKER, STANLEY J. GARTNER, ROBERT OBERG
*BY* Edward J. Coleman
AGENT

PRINTED CIRCUIT BOARD WITH THROUGH CONNECTION AND METHOD AND MACHINE FOR MAKING THE THROUGH CONNECTION

BACKGROUND OF THE INVENTION

This is a division of application Ser. No. 813,514, filed Apr. 4, 1969.

This invention relates to printed circuits and the manufacture of same. More particularly, the invention relates to an improved through connection between conductors on opposite sides of a printed circuit board and a method and machine for making the through connection.

Many current printed circuit applications, such as multilayer circuit boards, integrated circuit modules and other dense packaging arrangements, employ double-sided circuit boards having a plurality of interconnections extending through the insulating base between conductive patterns on both sides of the board. A number of techniques have been used to make these through connections, the more commonly known approaches being to use either a force-fitted pin, a wire feed through, an eyelet or a plated-through hole.

The first mentioned through connection is provided by force fitting a plated copper pin into a perforation in the printed circuit so that end portions of the pin project from both sides of the board. The force fit provides a fairly secure mechanical connection, however the requisite low resistance electrical connection between the pin projection and adjacent printed conductor terminal areas is reliant upon the application of solder to both sides of the board. To ensure a reliable force fit, the pins are prefabricated with a fixed diameter having rather tight tolerances; this aspect added to the fact that the insertion operation is normally performed by a hand operated tool makes this a comparatively expensive approach. Further, the required secure fit is also dependent upon the receiving hole in the printed circuit board being drilled to a slightly smaller diameter than that of the pin. When used with a fiberglass insulating board, the sides of the drill wear quite rapidly, and as the drill wears, the hole diameter tends to become smaller. Consequently, the drill bits must be replaced after relatively short intervals of usage in order to preclude damaging the printed circuit laminations upon insertion of the pin.

The wire feed through connection is provided by inserting a wire through a preformed hole in the circuit board, clinching the wire down upon the conductor terminal areas on both sides of the board and soldering the wire-conductor contact areas. A highly reliable mechanical and electrical connection results, but as the operations are normally performed by hand, the wire feed through has proved to be relatively expensive as compared to the other approaches denoted above.

A number of problems are presented by the use of eyelets for providing through connections in printed circuit boards. For the case where the eyelet is clinched at both ends against the conductor terminal areas, the dimensions of the eyelet and the machine adjustment for providing the roll over on each side of the board is relatively fixed. The copper clad board thickness, on the other hand, is subject to considerable variation due to the build up of thickness deviations in the laminations of insulation and conductor material. As a consequence, the quality of the eyeletting operation tends to be inconsistent in that the roll over had been found to rupture the conductors on boards exceeding the thickness provided for by the eyelet machine setting. After the usual soldering operation, another undesirable feature arises with respect to the solder joint formed between the eyelet and the conductive terminal areas on each side of the board; the solder tends to form a fillet in the region of the eyelet roll over so that only a point contact is made about the periphery thereof. As a result, due to the different coefficients of expansion of the insulating and conductive laminations, the solder joint is quite prone to rupture when the printed circuit board is exposed to an environment having wide temperature variations.

Many of the aforementioned disadvantages are overcome by funnel flanging the eyelet instead of clinching it. By this approach, one end of the eyelet is flared prior to assembly, and, upon insertion into a preformed hole in the printed circuit board, the opposite end is flared. As a consequence, the problem of rupturing conductive traces due to variations in the thickness of the printed circuit board is avoided. In addition, in a wave soldering operation, the solder will tend to back fill under the flared portion of the eyelet to provide a considerably improved solder joint; when a component lead is inserted through the hole extending through the center of the eyelet, the electrical connection is further improved by virtue of the fact that the flare acts as a funnel for solder flow by capillary action through the hole. In spite of these improvements, when using wave soldering on one side of the circuit board, poor joints have been experienced as a result of improper wetting of the solder flowing through to the component side of the board due to the heat sink action of the insulating lamination.

In general, none of the aforementioned approaches are suitable for extremely dense packaging, such as certain types of circuit modules and multilayer structures. One reason is that each of these types of through connections have protruding portions on both sides of the circuit board; although in the case of the force-fitted pin, this can be remedied by sanding down the projecting portions prior to solder plating. In addition, the printed circuits employed in dense packaging applications usually require extremely small diameter through-holes, e.g. of the order of 0.016 inch, and although pins and eyelets are available in such size ranges, they are quite difficult to handle in the assembly operation.

In view of the relative unsuitability, and in some instances unreliability, of force-fitted pins, wire feed throughs and eyelets, a very widely used method for making through connections in printed circuit boards is the plated-through hole. By this approach, a reliable, nonprotruding interfacial connection is provided by the deposition of conductive material on the sides of a preformed hole extending through the terminal areas and insulating base of the printed circuit board. The result is a contiguous and continuous conducting path between the terminal areas on opposite sides of the board which is well suited to extremely small hole sizes.

For these reasons, high density printed circuit arrangements with high reliability requirements have been heretofore limited almost exclusively to the use of plated-through holes for providing through connections. The attainment of consistently high quality through platings, however, requires a critically controlled process, typically comprising about 18 separate steps, including water rinses, acid baths and chemical or electrochemical depositions. Hence, the aforementioned advantages of plated-through holes are achieved at the cost of a considerably expensive and cumbersome production process not readily adapted to automation.

SUMMARY OF THE INVENTION

With an awareness of the aforementioned disadvantages of the prior art, it is an object of the present invention to provide an improved electrical through connection in insulating material.

It is another object of the invention to provide a reliable through connection, particularly suited to high density printed circuit applications, and a relatively simple, low cost method and machine for making the through connection in a manner well adapted to automated production processes.

The above objects are carried out in one aspect of the invention by an electrically conductive element press-fitted in a sheet of electrically insulating material in a manner providing exposed surfaces of the element on both sides of the insulation. The conductive element will then function as a through connection between any conductors disposed on opposite sides of the insulating material in contact with portions of the element. In another aspect of the invention, apparatus and methods for inserting the conductive element into the insulating material are provided. One method comprises registering the insulating material in a predetermined receiving position, positioning conductive stock material with respect to the insulating material, removing the conductive element from the stock material, and pressing the element into the insulating material at the receiving position. The element may then be peened to further secure it into the insulating material. Apparatus according to the invention includes means for holding the insulating material in a predetermined position, means for supplying and indexing conductive stock material over the insulating material, a punch for removing the conductive element from the stock material and inserting that element into the insulating material, and a drive mechanism for the punch.

BRIEF DESCRIPTION OF THE DRAWINGS

This invention will be more fully described hereinafter in conjunction with the accompanying drawings, in which.

DESCRIPTION OF THE PREFERRED EMBODIMENTS:

For a better understanding of the present invention, together with other and further objects, advantages and capabilities thereof, reference is made to the following disclosure and appended claims in connection with the above-described drawings.

Figure 1:
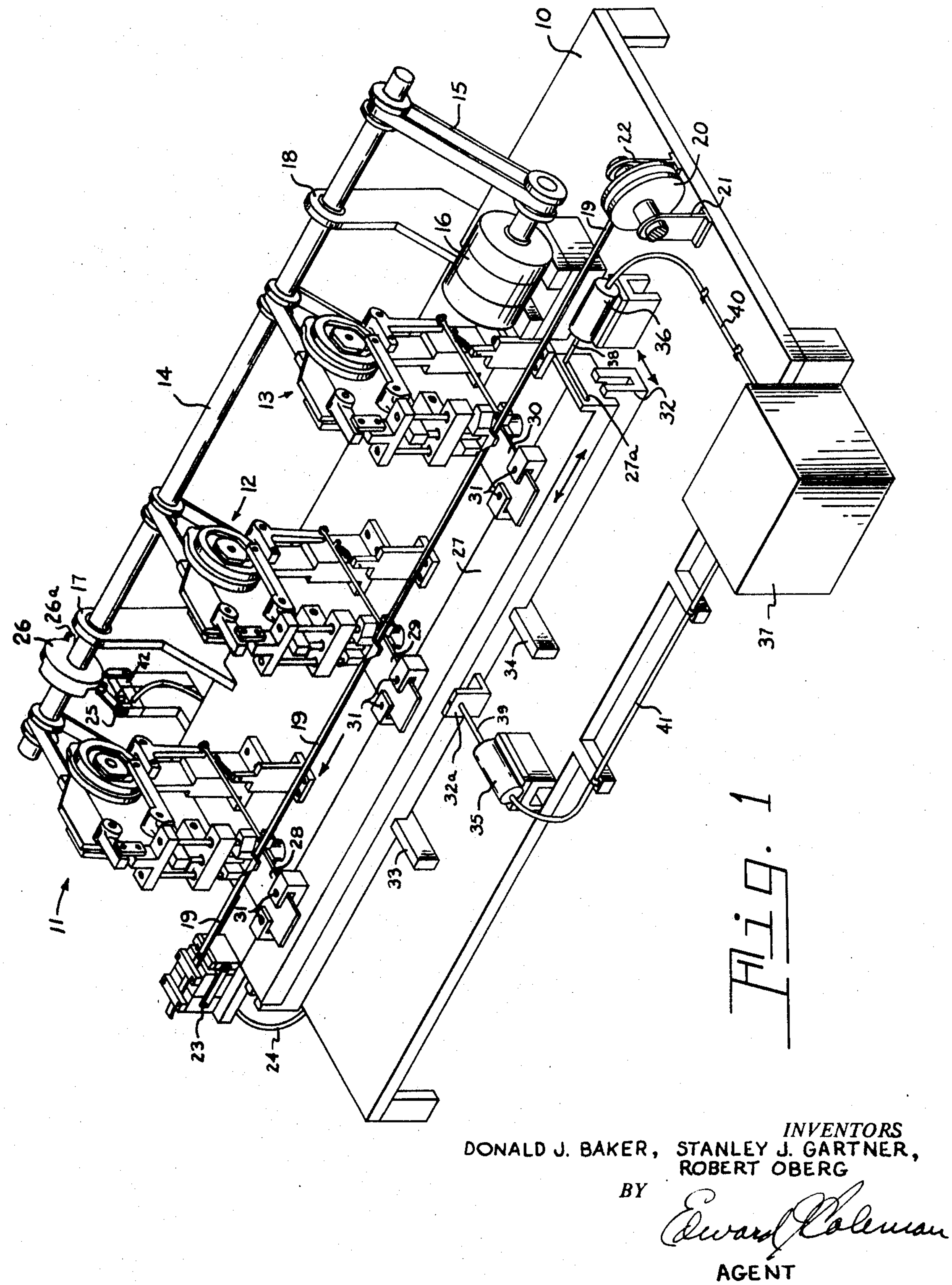
FIG. 1 is a perspective view of a multiple head machine in accordance with the invention.

The apparatus basically comprises a cam actuated head for removing a conductive element from supplied stock material and inserting the element into a printed circuit board at a predetermined location, thereby making a through connection. For mass production purposes, the advantages of common drive, supply and positioning mechanisms can be obtained by using a plurality of such heads to simultaneously make through connections in a like plurality of circuit boards. FIG. 1 shows such apparatus mounted on a table 10 and comprising, for purposes of illustration, three cam actuated heads 11, 12 and 13, each adapted to receive operating motion through respective drive belts engaging a common shaft 14, driven through belt 15 by a motor 16. The common shaft is rotatably mounted on a pair of support members 17 and 18 secured to table 10.

Electrically conductive stock material in the form of a strip 19, preferrably of a thickness equal to or greater than the thickness of the circuit board, is wound on a supply reel 20 rotatably supported on brackets 21, 22 at one end of table 10. Strip 19 is threaded through a component of each head, as will be described hereinafter, and through an indexing mechanism 23, which is mounted at the end of table 10 opposite that at which reel 20 is mounted. Indexing mechanism 23 is operative to advance strip 19 a predetermined increment, in the direction indicated by the arrow, and may be an air feed device. For example, one air feed mechanism suitable for this application is the Rapid-Aire model A2-5342 available from Mechanical Tool and Engineering Company, Rockford, Ill.; reference U.S. Pat.

No. 3,038,645. Air pressure, from a source not shown, is applied to and evacuated from air feed 23 via tube 24 as controlled by a switch 25 actuated periodically by a cam 26 fixedly mounted on drive shaft 14.

A frame 27 holds three printed circuit boards 28, 29 and 30 to be operated upon respectively by heads 11, 12 and 13. The circuit boards are located on and secured to frame 27 by pairs of locating pins 31, which pass through appropriate indexing holes in each board. Frame 27 is slidably mounted upon an *x*-positioning guide 32, which in turn is slidably mounted on a pair of *y*-positioning guides 33 and 34 secured to table 10. This frame and guide arrangement permits simultaneous two-dimensional positioning of the printed circuit boards to thereby enable registration of each board in a predetermined element receiving position with respect to each head.

Calibrated movement of frame 27 and guide 32 may be accomplished manually by use of a lead screw and crank. For automated production purposes, however, a numerically controlled positioning system may be used, in combination with a punched tape electronic controller, to automatically register the printed circuit boards according to a predetermined sequence of receiving positions at which through connections are to be made. An example of equipment suitable for this purpose is the model 6025 numerically controlled positioning system, available from the Universal Instruments Corporation, Binghamton, N.Y., together with the Mark Century 120 Control System, available from the General Electric Company.

For purposes of simplified illustration, the positioning system shown in FIG. 1 comprises a pair of air cylinders 35 and 36 and a control source 37. Air cylinder 36 is operative to impart bidirectional motion to frame 27, as denoted by the arrows, through a piston rod 38 slidably secured to the frame in slot 27*a* thereof. Cylinder 36 and rod 38 may therefore be considered as providing *x*-axis positioning of the circuit boards mounted on frame 27. Y-axis positioning is provided by air cylinder 35, which imparts bi-directional motion to carrier guide 32, and thus frame 27, as denoted by the arrows, through a piston rod 39 fixedly secured to a bracket 32a projecting from guide 32.

Piston rod 38 is actuated by air pressure applied or evacuated via tube 40, which connects suitable pumping apparatus in control source 37 to air cylinder 36. The amount and direction of air flow during each positioning cycle may be regulated by appropriate punched tape, numerical control apparatus in source 37. Any change in air pressure transmitted as motion via rod 38 will determine the amount and direction of frame 27 sliding motion on guide 32, bracket 32*a* providing the necessary clearance for this lateral motion. In like manner, piston rod 39 is air pressure actuated via tube 41 connected between source 37 and cylinder 35. The change in air pressure transmitted as motion via rod 39 determines the amount and direction of the sliding motion of carrier guide 32 on guides 33 and 34. Clearance for the resulting forward or backward motions of frame 27, which is carried upon guide 32, is provided by slot 27*a*. Triggering of each positioning cycle of control source 37 may be provided by transmitting an electrical signal from a switch 42 periodically actuated by a projection 26*a* on cam 26.

Structural details of a typical one of the cam actuated heads will now be described with reference to FIG. 2, which illustrates a portion of the apparatus of FIG. 1 including head 12. The operating elements of the head include a punch 43 and punch holder 44, a punch head 45, and a die holder 46 pivotally connected to a mounting post 47. Cooperative actuation of the punch, punch head and die holder is controlled by a cammed disk 48 having two sets of constraining cam surfaces 48*a* and 48*b* on opposite sides thereof (only set 48*a* is visible in FIG. 2, a portion of set 48*b* being visible in FIG. 3) and a peripheral cam surface 48*c*. Cammed disk 48 is fixed to a cam shaft 49, which is rotatably mounted on a support member 50. The means for actuating the punch 43 includes a lever arm 51 pivotally mounted on a fulcrum stud 52 projecting from support 50, a linkage 53 pivotally connecting punch holder 44 to one end of arm 51, and a cam follower 54 attached to the other end of arm 51 and constrained between cam surfaces 48*a*.

The punch head 45 actuating means includes a lever arm 55 pivotally mounted on a fulcrum stud 56 projecting from support 50. A linkage 57 is pivotally connected from one end of arm 55 to a member 58, from which punch head 45 is suspended by a pair of rods 59 and 60 passing through guide holes 61a and b in a bracket 61 attached to support 50. Attached to the other end of arm 55 is a cam follower 62 (partially visible only in FIG. 4), which is constrained between cam surfaces 48b (partially visible only in FIG. 3).

The means for shifting the die holder includes a linking rod 63 pivotally connected at one end to die holder 46 and at the other end to a lever arm 64. Arm 64 is pivotally mounted on a fulcrum stud 65 projecting from support 50 and has a cam follower 66 attached at the end opposite that at which rod 63 is attached. A spring 67 is connected between a projection 63*a* from rod 63 to a bracket 68 so as to spring load arm 64 and thereby restrain cam follower 66 in contact with cam surface 48*c*. Mounting post 47, support 50 and bracket 68 are all securely fastened to table 10 (FIG. 1).

Figure 4:
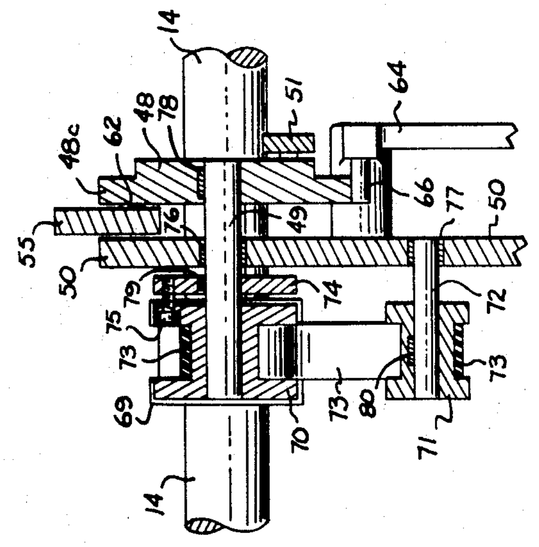
FIG. 4 is a sectional view on line 4—4 of FIG. 3.
Figure 3:
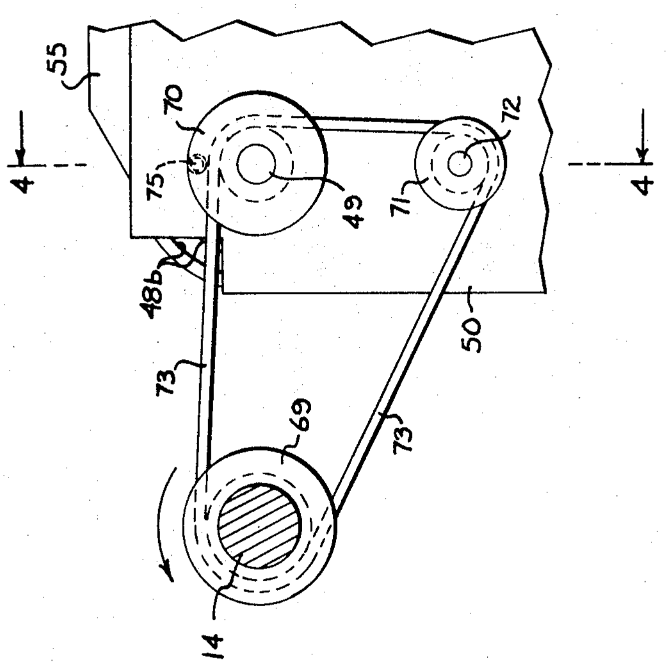
FIG. 3 is a side elevation showing the belt drive for the cam actuated head of FIG. 2.

The belt drive for cammed disk 48, best illustrated by FIGS. 3 and 4, comprises a drive pulley 69 fixedly mounted on the common drive shaft 14, a driven pulley 70 rotatably mounted on cam shaft 49, an idler pulley 71 secured to a shaft 72 rotatably mounted on support 50, and a drive belt 73 engaging the pulleys in a manner to transmit motion from drive pulley 69 to driven pulley 70. In order to transmit motion through cam shaft 49 to the cammed disk 48, rotatable pulley 70 is secured by means of a threaded dowel pin 75 to an adjacent disk 74, which is fixed to cam shaft 49. This arrangement is particularly advantageous when operating a plurality of heads from a common drive shaft, as shown in FIG. 1, in that it permits a selected head to be conveniently rendered inoperative, as required for maintenance, etc., merely by removing dowel pin 75 to thereby disengage driven pulley 70 from the cam shaft. In FIG. 4, bushings 76 and 77 are shown as providing bearings in support 50 for shafts 49 and 72, respectively. Disks 48 and 74 are fixed to shaft 49 by keys 78 and 79, respectively, and pulley 71 is shown as fixed to shaft 72 by a key 80.

When using a plurality of punches in cooperation with a single strip of conductive stock material, as shown in FIG. 1, it is generally desirable to operate heads 11, 12 and 13 in synchronism. This may be accomplished by using a synchronous drive connection between the common drive shaft 14 and the cam shaft on each head, such as a cogged timing belt, a chain drive, a direct gear drive, or any other synchronous driving means.

Figures 5, 17, 19, 20:
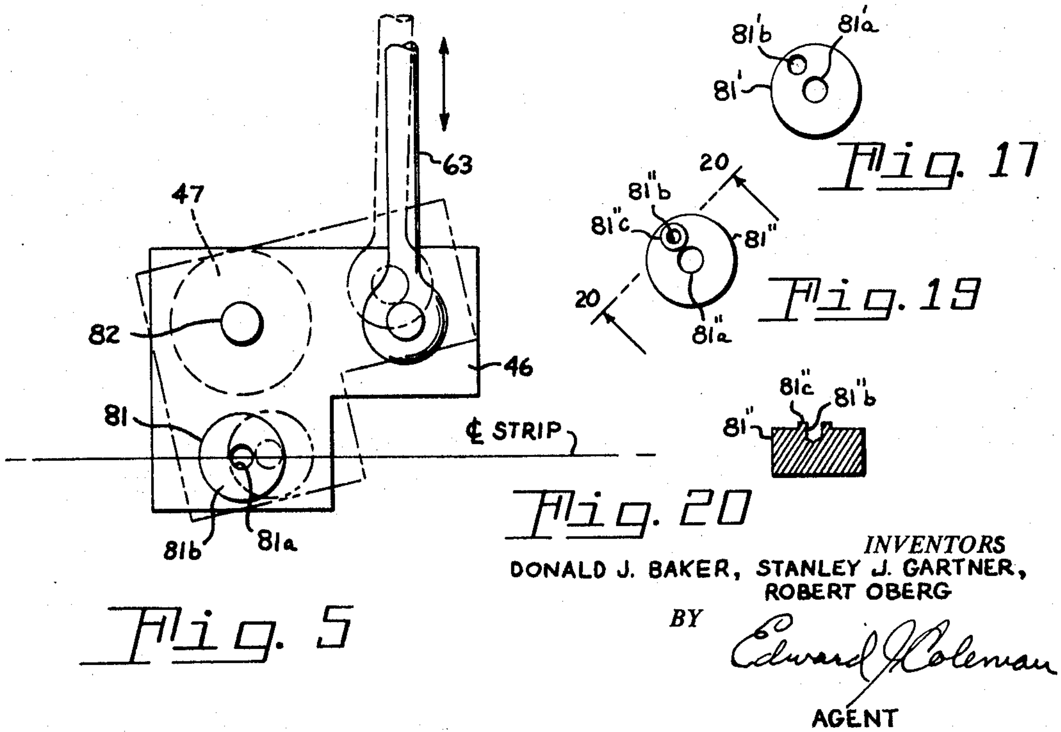
FIG. 5 is a plan view of a die holder coupled to the head of FIG. 2, with a phantom line image illustrating the shifted position thereof.
FIG. 17 is a plan view of an alternate die, having two cavities, for use with the die holder of FIG. 5.
FIG. 19 is a plan view of a second alternate die, having a rim about one of two cavities, for use with the die holder of FIG. 5.
FIG. 20 is a sectional view on line 20—20 of FIG. 19.

FIG. 5 is a plan view of die holder 46 and a portion of rod 63, with a phantom line image illustrating the shifted position of these elements. A female die 81 having a cavity 81a and a flat top surface 81b (see FIG. 6 also) is securely attached to the top of holder 46, which is adapted to pivot about a pin 82 secured to mounting post 47.

Figure 6:
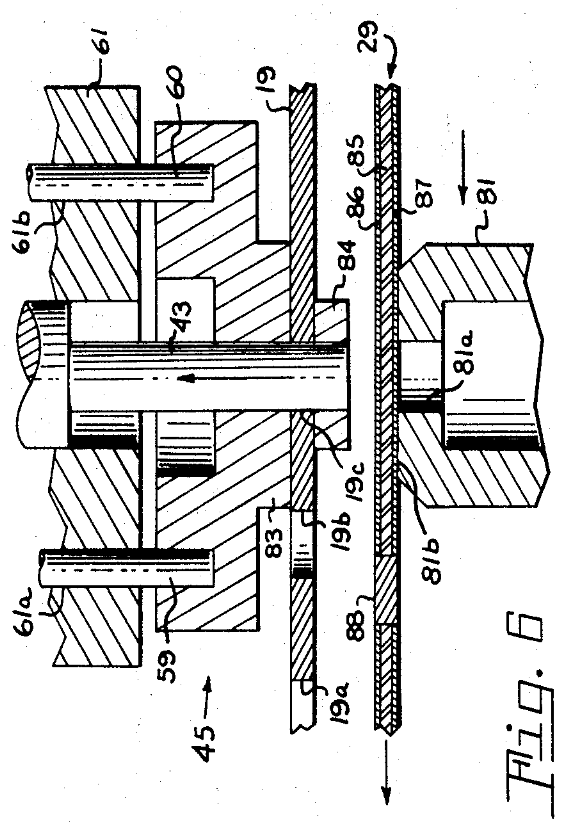

The details of punch head 45 are illustrated in FIG. 6. The punch head assembly basically comprises two members: a stripper 83 attached to rods 59 and 60, and a punch receiving receptacle 84 connected to stripper 83 by machine screws (not shown) so that strip 19 may be slidably retained therebetween (see FIGS. 10 and 22). Both members contain holes in registry with punch 43 and through which the punch passes during the conductive element insertion operation. As will become apparent hereinafter, member 83 functions to strip the stock material 19 from retracted punch 43, and punch receiving receptacle 84 functions during various steps of the operation as a pressure plate, stripper and die.

A peferred method for making a through connection according to the invention will now be described with reference to the sectional views of FIGS. 6–13, which illustrate in a eight-step sequence the operations of punching a hole in circuit board 29 at a predetermined location, removing a conductive element from strip 19, and inserting and peening that element into the circuit board. FIG. 6 represents the first method step and shows circuit board 29 registered in a predetermined receiving position with respect to retracted punch 43. Board 29 comprises a sheet of electrically insulating material 85 having conductors 86 and 87 etched, plated, or otherwise secured on opposite sides thereof. A conductive element 88 previously inserted in the circuit board is shown indexed to the left of the punch. The cross-sectional view is somewhat simplified in that the conductor traces 86 and 87 are shown as continuous, whereas in actuality they are arranged in strip patterns with circular terminal areas through which the interfacial connections are made. Female die 81 is positioned below the circuit board with its cavity 81a in registry with the punch. This is illustrated by the solid line image of the die arrangement shown in FIG. 5. Punch head 45 is in a position spaced away from the circuit board. The strip of conductive stock material 19 is shown as having preformed holes 19*a*, *b* and *c*, with hole 19*c* being used as a guide for punch 43, which is passed therethrough and closed with receptacle 84 to prevent the strip from shifting.

Figure 7:
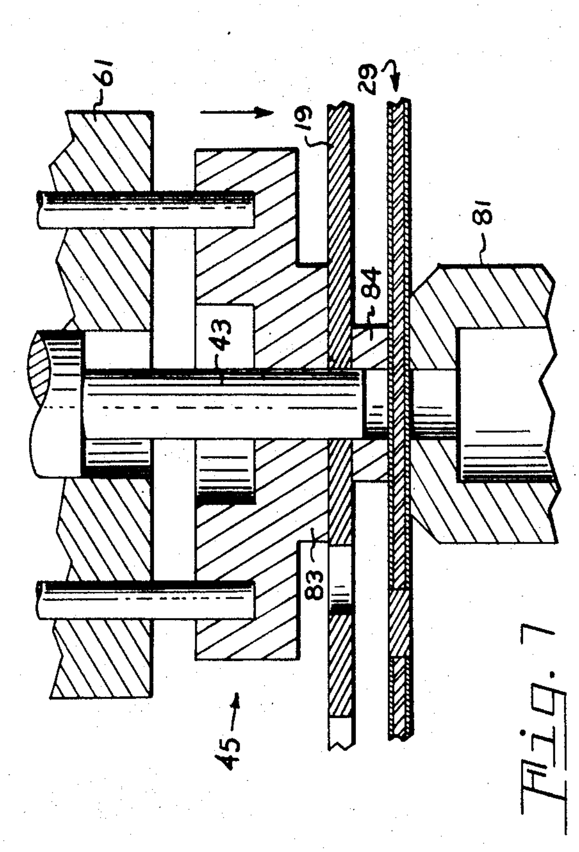
FIGS. 6–13 are sectional views on line 6—6 of FIG. 2 which illustrate a preferred sequence of method steps according to the invention.
Figure 9:
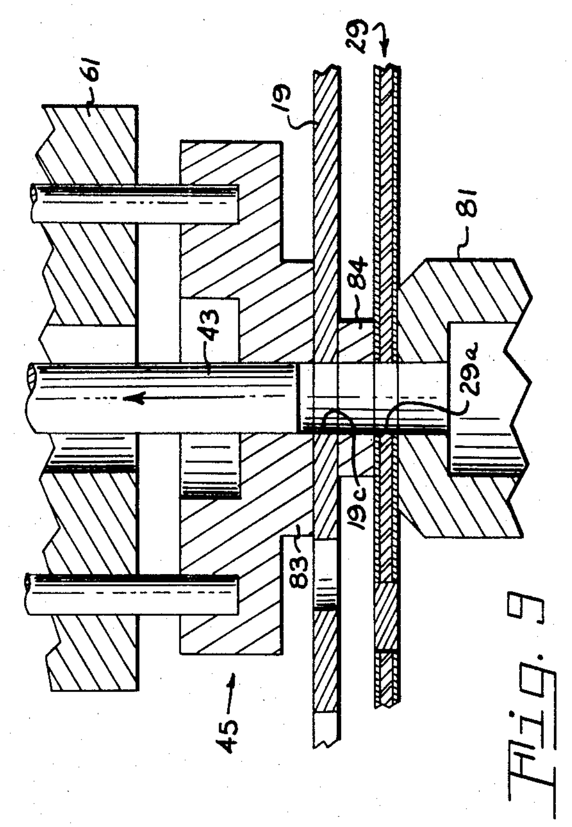
Figure 8:
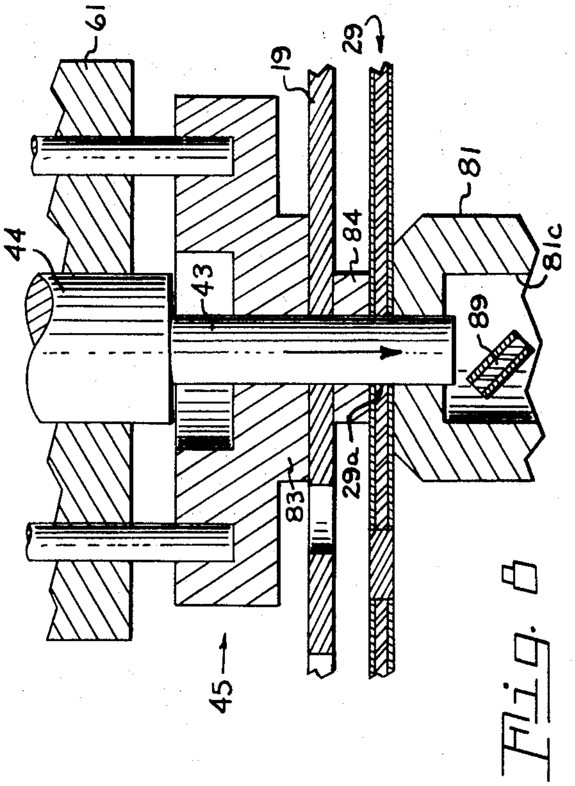

During the second step, shown in FIG. 7, punch head 45 is moved downward to press punch receiving receptacle 84 against the circuit board 29, thereby holding the board in position against the die 81. The third step, FIG. 8, is to move punch 43 downward toward closure with die 81 and, thus, punch a hole 29*a* in circuit board 29 at the registered receiving position. An enlarged interior cavity 81*c* of die 81 allows clearance for passing the scrap 89 removed from the circuit board. Step four, FIG. 9, consists of retracting punch 43 upward to a position beyond the preformed hole 19*c* so as to permit strip 19 to be advanced. As punch 43 is being retracted in this manner, receptacle 84 functions to strip circuit board 29 from the punch, and member 83 serves to strip conductive stock 19 from the punch.

Figures 10, 11, 12, 13:
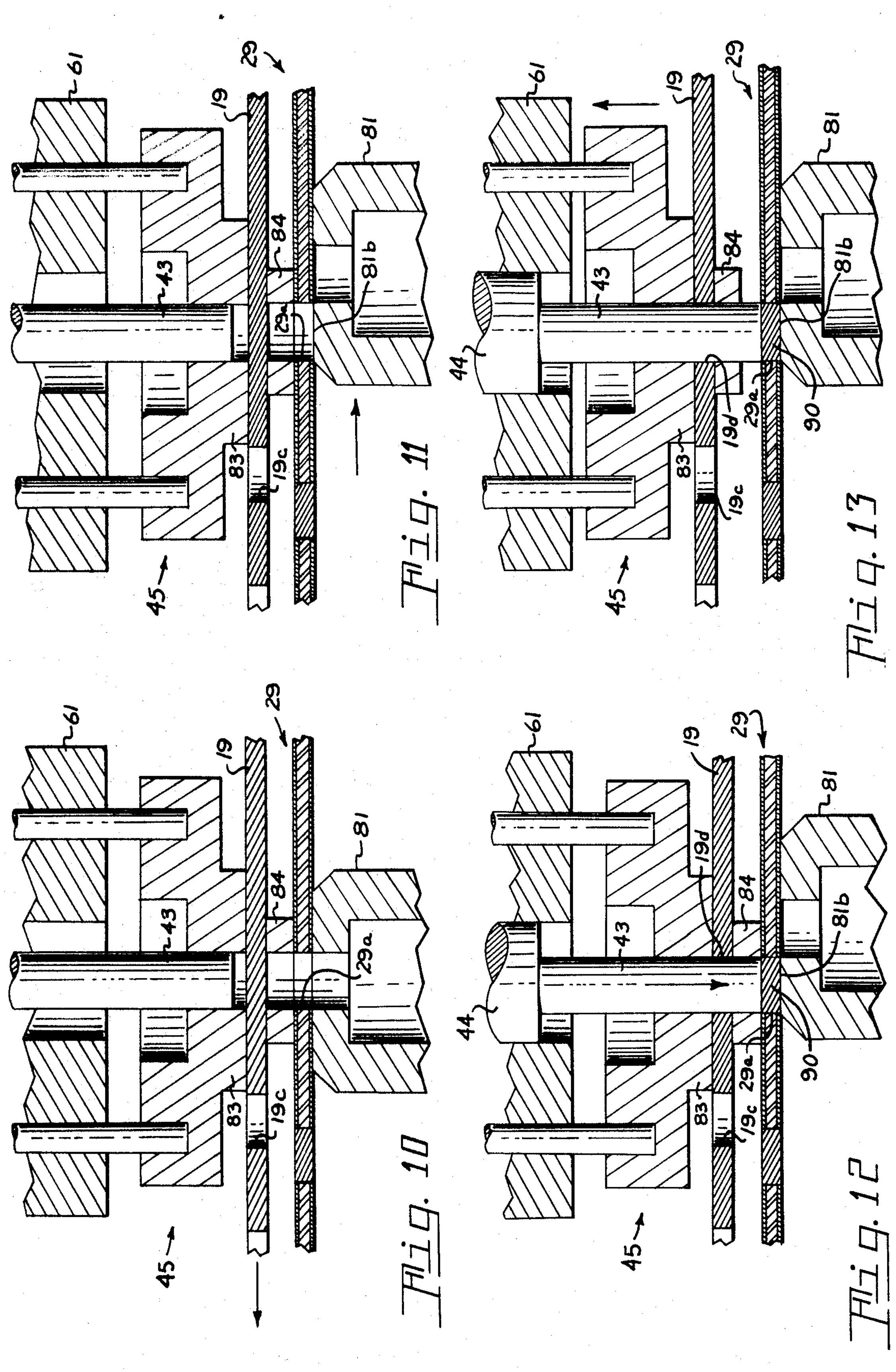

In the fifth method step, FIG. 10, strip 19 is indexed to the left so as to displace preformed hole 19c from under punch 43. Next, as step six, die 81 is laterally shifted to the right, as shown in FIG. 11, so that the flat top surface 81*b* thereof encloses hole 29*a* on the bottom side of the circuit board. This shifted position of die 81 is also illustrated by the phantom image in FIG. 5.

FIG. 12 shows, as the seventh step, the insertion and peening stroke of the punch. More specifically, punch 43 is moved downward toward closure with receptacle 84, which now functions as a female die. As a result, the punch penetrates the solid electrically conductive material of strip 19 and removes a cylindrical slug therefrom, which shall be referred to as conductive element 90. In its continuing downward stroke, the punch 43 presses element 90 into the hole 29*a* in the circuit board and peens, or compresses, element 90 against the flat die surface 81*b*, which thereby functions as an anvil. As the eighth and final step, FIG. 13, punch head 45 is retracted upward to move strip 19 away from the circuit board while punch 43 is still holding element 90 in hole 29*a*. This technique ensures that all strip 19 material is cleanly severed from element 90 so that the element is not inadvertently pulled out of the circuit board by retraction of the head and punch. The apparatus is then returned to the starting position, shown in FIG. 6, by partially retracting the punch 43, shifting die 81 laterally to the left, and moving circuit board 29 to a new receiving position. In this instance, the hole 19*d* formed in strip 19 by the removal of element 90 in step seven, FIG. 12, serves as the guide for the next board punching operation.

Figures 14, 15, 16, 18, 21:
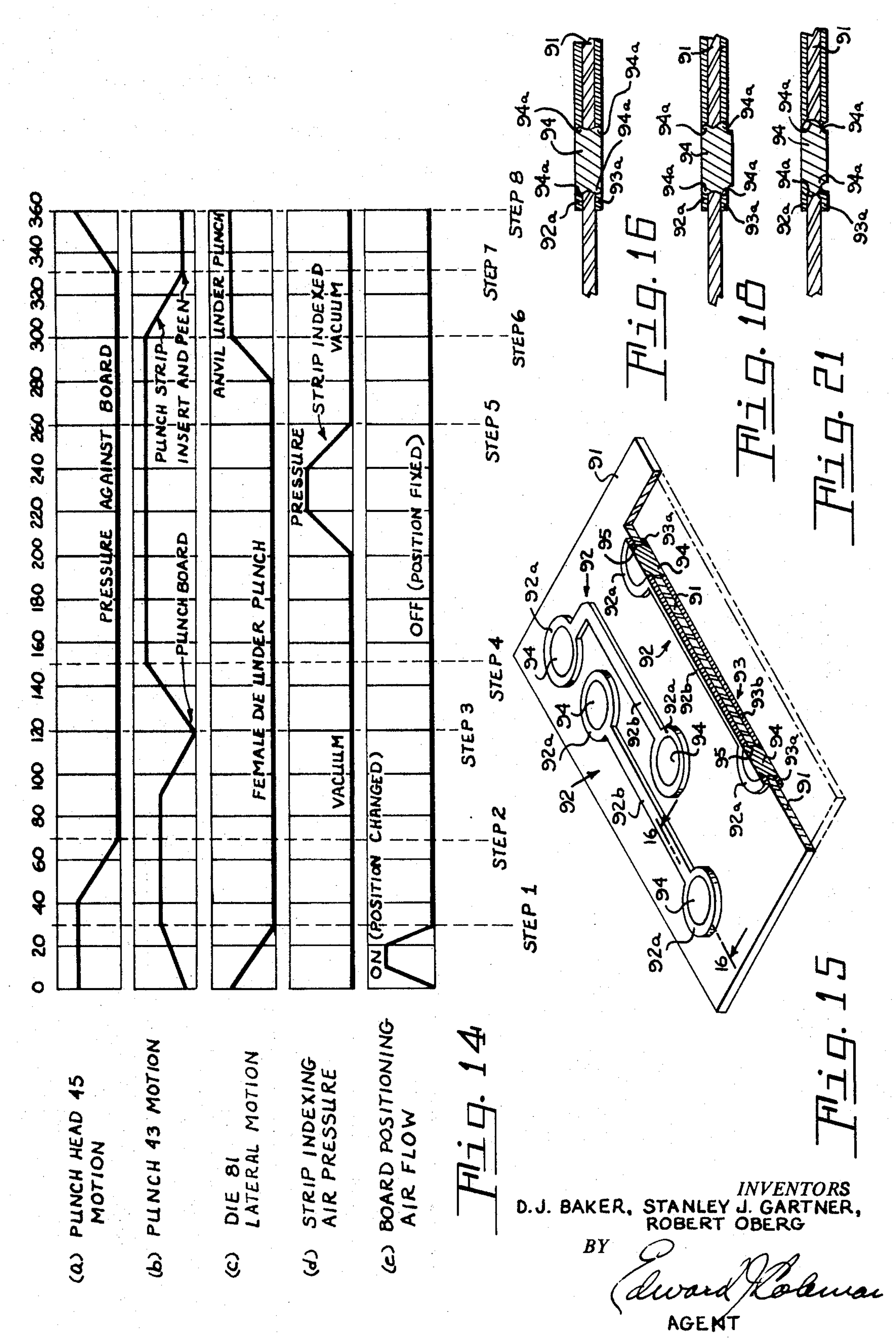
FIGS. 14(*a*)–(*e*) are bar charts illustrating machine functions associated with the method steps illustrated by FIGS. 6–13.
FIG. 15 is a perspective view of a printed circuit board, with cut away sections, having through connections in accordance with the invention.
FIG. 16 is a sectional view on line 16—16 of FIG. 15 for the case where an anvil is used in the peening operation according to the invention.
FIG. 18 is a sectional view similar to that of FIG. 16 for the case where the die of FIG. 17 is used in the peening operation.
FIG. 21 is a sectional view similar to that of FIG. 16 for the case where the die of FIGS. 19 and 20 is used in the peening operation.
Figure 23:
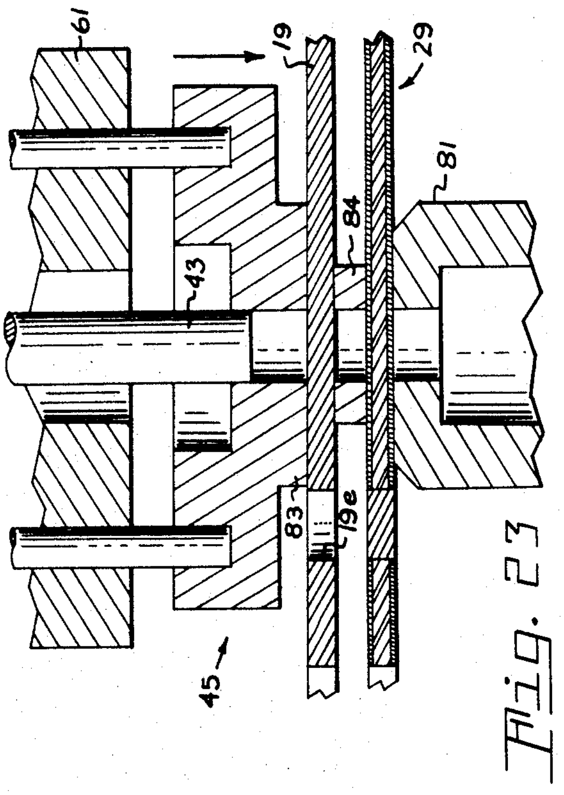
FIGS. 22–25 are sectional views similar to that of FIG. 6 which illustrate an alternate sequence of method steps according to the invention.
Figure 25:
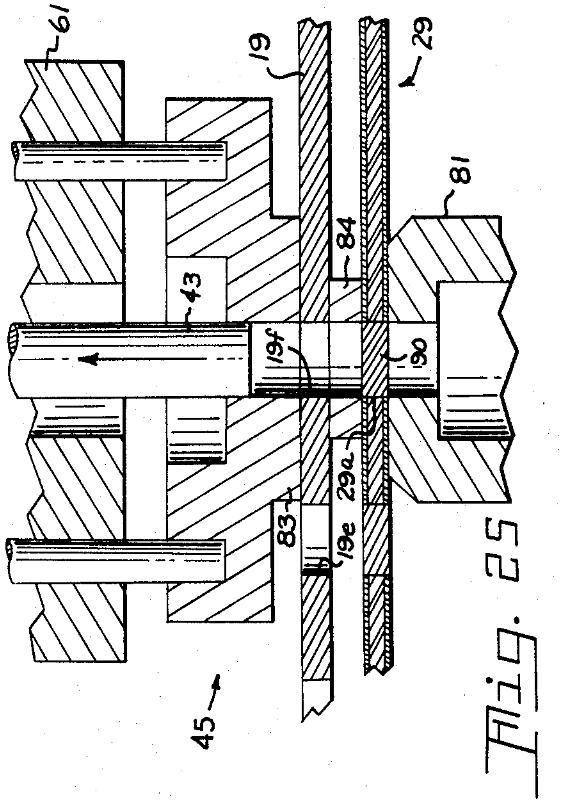

The coaction of the operating elements of the apparatus shown in FIGS. 1–5 in carrying out the aforementioned eight method steps will now be described with reference to FIG. 14, which illustrates by means of bar charts the pertinent machine functions occurring during a single 360° rotation of cams 26 and 48. FIG. 14(*b*) is a diagram representing the up and down reciprocating motion of punch 43 as actuated by lever arm 51 in response to the rotational travel of cam surfaces 48*a* (FIG. 2). It will be noted that the cam shape causes the punch to reciprocate once during each of first and second alternate cycles over the period of one cam rotation. The contours of cam surfaces 48*a* covering the angular displacement from about 30° to 150° are such as to actuate punch 43 through punch head 45 and a preformed hole in strip 19 to penetrate circuit board 29 and form an aperture therein and to retract the punch beyond the preformed hole in strip 19 during the first alternate cycle. This represents the punch travel from method steps one through four illustrated in FIGS. 6–9. Over the angular displacement from about 150° through o°/360° to 30°, the contours of surfaces 48*a* actuate punch 43 through punch head 45 to remove the conductive element 90 from the indexed strip 19, to insert that element into the aperture in circuit board 29 and to partially retract the punch during the second alternate cycle. FIGS. 10–13 and FIG. 6 illustrate this portion of the punch travel through method steps five to eight and back to step one. The shape of cam surfaces 48*a* and the linkages to punch 43 are designed to constrain the maximum downward stroke of the punch at 330° so as to obtain a peening or compressing action which optimizes the electrical and mechanical connection provided by element 90, without damaging the circuit board.

The motion of punch head 45 is diagrammed in FIG. 14(*a*). In this case lever arm 55 renders an up and down motion to the punch head in response to the rotational travel of cam surfaces 48*b* (FIGS. 2 and 3). More specifically, the contours of cam surfaces 48*b* actuate head 45 to press receptacle 84 against the circuit board 29 during a substantial portion (80° to 330°) of the aforementioned first and second alternate cycles of the punch drive and to retract receptacle 84 away from the circuit board for a period (starting at 330°) prior to the first alternate cycle of the punch drive (which commences at 30°).

Figure 2:
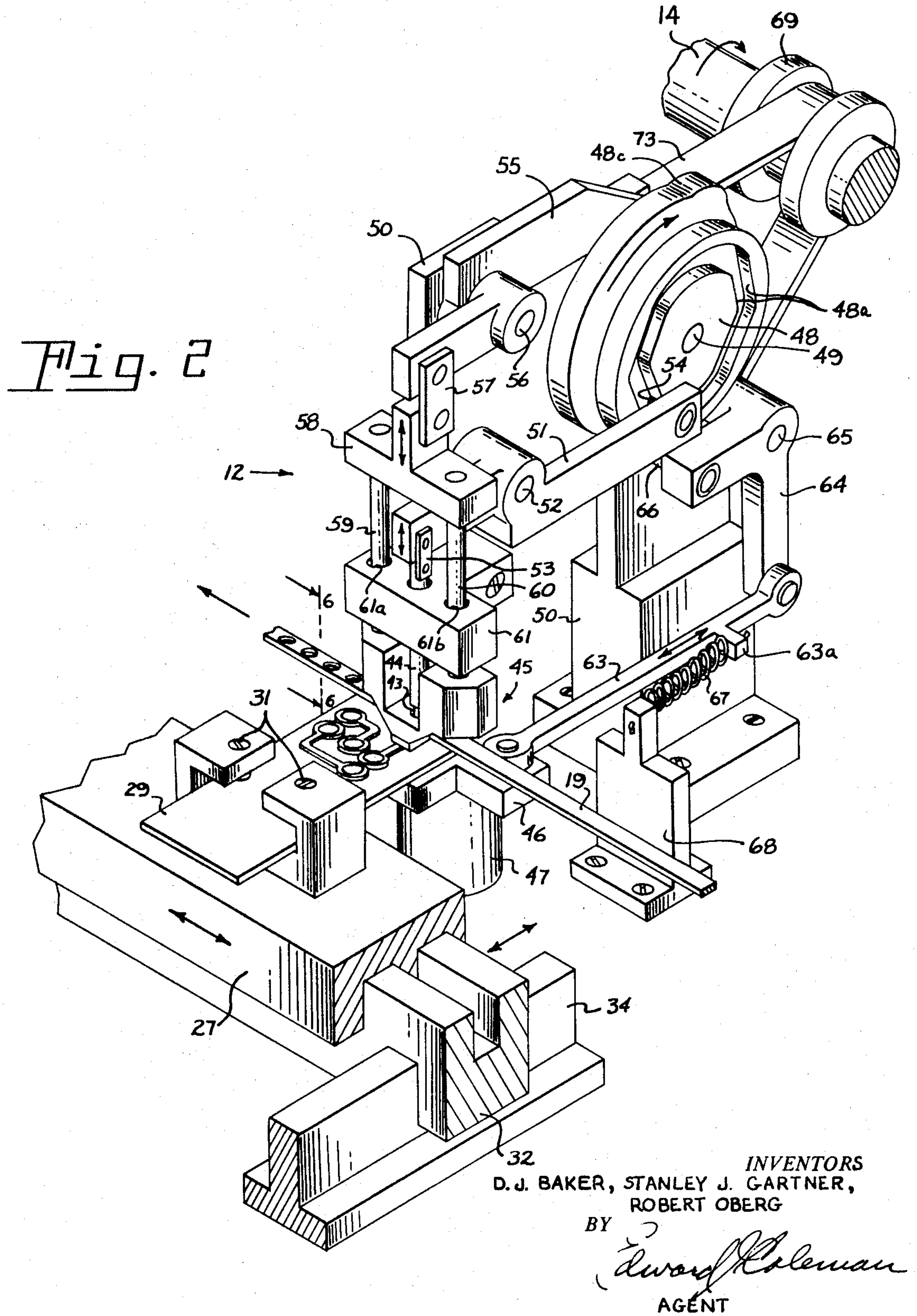
FIG. 2 is a perspective view of a portion of the machine of FIG. 1 including a typical cam actuated head.

FIG. 14(*c*) represents the lateral shifting motion, from left to right and back, of die 81 as actuated by lever arm 64, through rod 63 connected to pivoted die holder 46, in response to the rotational travel of cam surface 48*c* (FIG. 2). The surface 48*c* contour over the angular displacement from 30° to 280° permits cavity 81*a* of die 81 to be in registry with punch 43 during the first alternate cycle of the punch drive; more specifically the female die is registered during method steps one through five, illustrated in FIGS. 6–10. The contour of cam surface 48*c* commencing at 280°, however, is such as to laterally shift die 81 so that flat surface 81*b* thereof encloses the aperture in circuit board 29 during a substantial portion (300° to 360°) of the second alternate cycle of the punch drive. Thus, the anvil 81*b* is under the punch during steps six through eight, illustrated in FIGS. 11–13.

FIG. 14(*d*) illustrates the application of air pressure to the indexing mechanism 23 via tube 24 (FIG. 1). After rotating 200°, the contour of cam 26 is operative to trigger switch 25 to apply air pressure to mechanism 23. Upon traveling to 240°, cam 26 triggers the evacuation of air, which thereby causes indexing mechanism 23 to pull strip 19 a preset increment for method step five (FIG. 10). By 260°, a vacuum is formed in the chambers of mechanism 23 and maintained through 0°/360° to 200°, so as to hold the strip in a fixed position through steps six to eight and one to four.

FIG. 14(*e*) represents the on and off air flow control of either, or both, of the air cylinders 35 and 36 via tubes 40 and 41 (FIG. 1). At the beginning of the rotational cycle of cam 26 (0°), projection 26*a* thereof triggers control source 37, via switch 42, to commence numerical control of the positioning of frame 27. The amount and direction of air flow to or from cylinders 35 and 36 is then regulated to simultaneously position all the circuit boards carried on frame 27, including board 29, to achieve registration between each punch 43 and the next predetermined receiving position on each respective board. By 30° of cam rotation, circuit board registration is achieved, and air flow is shut off by control source 37 to maintain the circuit board in a fixed position through the balance of the cam cycle for steps one to eight.

Referring to FIG. 14, the machine operating cycle may be summarized as follows: From 0° to 30° (step one, FIG. 6): the punch is retracted to a position below the hole formed in strip 19 during the previous cycle; female die 81 is shifted to its normal position in registry with the punch; and air flow control source 37 is actuated to register each circuit board in a new position. From 40° to 80° (step 2, FIG. 7), the punch head is lowered against the circuit board. From 90° to 120° (step 3, FIG. 8), the punch is actuated downward to punch a hole in the circuit board and close with die 81. From 120° to 150° (step 4, FIG. 9), the punch is fully retracted to a position above the preformed hole in strip 19. Between 200 and 260° (step 5, FIG. 10), air pressure is applied to and evacuated from mechanism 23 to index strip 19. From 280° to 300° (step 6, FIG. 11), die 81 is shifted to act as an anvil under the punch. From 300° to 330° (step 7, FIG. 12), the punch is actuated downward to punch element 90 out of strip 19 and to insert and peen that element into the circuit board and against the anvil. Finally, from 330° to 360° (step 8, FIG. 13), punch head 45 is raised while the punch is still down so as to assure a clean severance of element 90 from strip 19. The cycle then repeats until all the required through connections have been made in the circuit boards loaded on frame 27. The completed circuit boards (insofar as through connections) are then removed from frame 27, after which a new set of circuit boards may be loaded on the machine, and control source 37 may be reset to initiate another series of positioning cycles.

FIG. 15 illustrates, in perspective view with cut away sections, a printed circuit board having through connections inserted in accordance with the invention. It will be assumed that the portion of the circuit board having indexing holes for locating pins 31 (FIGS. 1 & 2) has been trimmed off. As previously mentioned, the circuit board comprises a sheet of electrically insulating base material 91 having conductors 92 and 93 disposed on opposite sides. Insulating material 91 may be rigid or flexible, and, as is commonly understood in the art, the terminology "circuit board" used herein is intended to encompass both rigid and flexible printed circuit structures. The conductors are formed in patterns having circular terminal areas 92*a* and 93*a* with planar interconnecting traces 92*b* and 93*b* which are bonded or otherwise secured to the insulating base 91. The usual manner of providing such a double-sided printed circuit is to commence with an insulating board having conductive sheets laminated on both sides. Each side is photosensitized with a photoresist coating and photographically exposed through a master transparency having a negative image of the desired circuit pattern. Alternatively, a resistive ink pattern may be applied to the conductive surfaces of the board by screening. Next, the board is etched to remove all conductive material not protected by resist, and then the resist is removed to leave the conductor patterns 92 and 93. In this condition the board is ready for loading on frame 27 (FIG. 1) for insertion of through connections at the terminal areas. It will be noted that the present invention eliminates the need for the usually required process steps of preliminary photosenitizing of the circuit board to locate hole centers and drilling or punching of holes prior to etching.

Referring again to FIG. 15, it will be noted that the solid, electrically conductive, cylindrical elements punched out of strip 19, here designated by the numeral 94, are press-fitted in respective apertures 95 extending through the insulating material 91 and terminal areas 92*a* and 93*a*. Since the exposed surfaces of elements 94 have been peened, as described with reference to FIGS. 12 and 14(*b*), lateral deformations 94*a* are formed in the proximity of the ends of each element 94, as illustrated in FIG. 16. These lateral deformations function to both enhance the mechanical attachment of element 94 in the insulating material and to further secure the conductive element in electrical contact with conductor terminal areas 92*a* and 93*a*. In fact, in a typical application of the invention, a cold weld has been obtained between the top end of element 94 and the adjacent terminal area 92*a*. As a result, element 94 provides a good conducting path through the insulation 91 between terminal areas 92*a* and 93*a* even prior to the application of solder to both sides of the board. Further, it will be noted that this improved through connection can be provided without any protrusions from the surfaces of the circuit board. Although it is preferable to have the stock material 19 somewhat thicker than the circuit board to allow for metal flow into the conductor areas adjacent element 94 upon peening, the resulting compressed configuration of the conductive element renders it essentially flush with the conductor surfaces.

The invention has been found to be particularly well suited to very thin printed circuit structures having extremely small hole sizes. For example, in one application of the invention, 0.016 inch diameter elements 94 were punched out of a strip 19 of copper stock having a thickness of 0.006 inch. These conductive elements were press fitted and peened into 0.016 inch holes in a flexible printed circuit board having an overall thickness of 0.005 inch. As for the structure of the circuit board, insulating material 91 comprised a 0.003 inch thick sheet of fiberglass reinforced epoxy, and conductors 92 and 93 each comprised a 0.001 inch lamination of copper.

FIG. 17 shows a first alternative configuration of die 81 which is designated 81'. In addition to having a cavity 81'*a* which is complementary to and in registry with punch 43 during the angular displacement of cam 48 from 30° to 280° (FIG. 14(*c*)), die 81' has a second cavity 81'*b* of diameter less than that of the punch. Cavity 81'*b* is located such that when the die is laterally shifted for the peening operation (300° to 360°), cavity 81'*b* is coaxially aligned with punch 43 and the hole 29*a* in the circuit board in lieu of the anvil surface 81*b*. In this manner, cavity 81'*b* functions as an upset die against which the inserted conductive element is peened by punch 43. The effect of this modification is illustrated in FIG. 18. As shown, the upset die 81'*b* allows a small amount of downward metal flow which effects an accentuation of the lateral deformation 94*a* of element 94 on the bottom side of the circuit board to provide an even more secure through connection. In an application of this type die for making 0.016 inch diameter through connections in the aforementioned 0.005 inch thick circuit board, cavity 81'*a* was 0.016 inch in diameter and cavity 81'*b* was 0.012 inch in diameter.

A second alternative die configuration, designated 81'', in shown in FIGS. 19 and 20. This embodiment includes a complementary cavity 81''*a* and upset die cavity 81''b located in similar fashion to cavities 81'*a* and 81'*b*. In this case, however, the upset die includes a rim 81''*c* which deforms both element 94 and terminal area 93*a* to further enhance the connection therebetween. This effect is illustrated in FIG. 21. In an application of this type die for making 0.016 inch diameter through connections in the aforementioned 0.005 inch thick circuit board, cavity 81''*a* was 0.016 inch in diameter, cavity 81''*b* was 0.0135 inch in diameter, and rim 81''*c* was 0.020 inch in outer diameter and 0.002 inch high.

Up to this point, the invention has been described with reference to a printed circuit board wherein conductors are secured to each side of a sheet of insulation. It is to be understood, however, that the invention also contemplates application to sandwich type circuit structures. For example, the conductor patterns on each side of an insulating base board may be precut from copper and merely compressed against the base board by second and third insulating boards, rather than being bonded thereto. Alternatively, the package may comprise a pair of single-sided printed circuit boards juxtaposed on opposite sides of an insulating base board. In these cases, a through connection is provided merely by inserting and peening a conductive element into the insulating base board so that exposed surfaces of the element on both sides of the board will make good electrical contact with the conductor patterns to be compressed thereagainst.

An alternate four-step method for making a through connection according to the invention is illustrated by FIGS. 22 – 25. The apparatus of FIGS. 1 – 5 is readily adapted to carry out this mode of operation by: disabling arm 64 and rod 63 so that female die 81 remains fixed in registry with punch 43; employing a cam 26 having appropriate contours to actuate strip indexing mechanism 23 during the first of the four method steps; employing cam surfaces 48a which are shaped to actuate punch 43 as described and illustrated with respect to FIGS. 22 – 25 hereinafter; and employing cam surfaces 48*b* shaped to retract punch head 45 between steps four and one and to move the punch head downward between steps one and two. In this manner, the four steps to be described are performed during a single 360° rotation of the cams.

Figure 22:
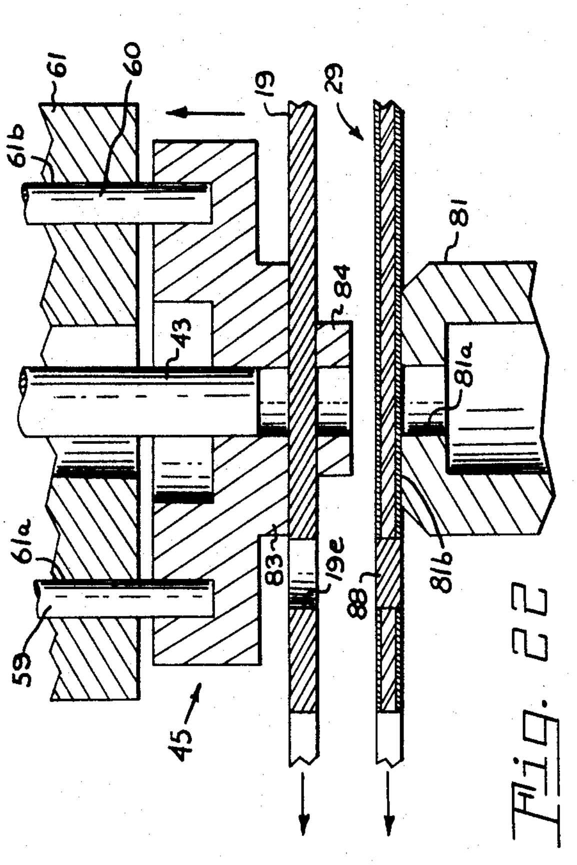

FIG. 22 represents the first step of the alternate method and shows circuit board 29 registered in a predetermined receiving position with respect to the retracted punch 43; female die 81 positioned below the circuit board with its cavity 81*a* in registry with the punch; punch head 45 retracted away from the circuit board; and strip 19 indexed to the left so as to displace a previously punched hole 19*e* from under the punch. It will be noted this is similar to the preferred step one shown in FIG. 6 except for the indexing of strip 19 and the position of punch 43 above the strip. During the second step, shown in FIG. 23, punch head 45 is moved downward to press punch receiving receptacle 84 against the circuit board, thereby holding the board in position against die 81. This is similar to preferred step 2 in FIG. 7.

Figure 24:
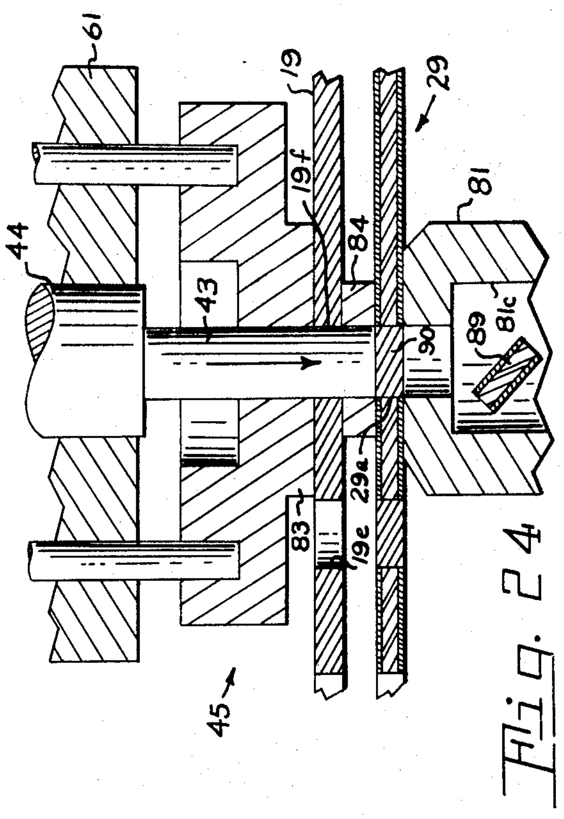

In the third step of the alternate method, FIG. 24, the removal of element 90 and its insertion into the circuit board are accomplished in one stroke of the punch. More specifically, punch 43 is moved downward toward closure with receptacle 84, now acting as a female die. As a result, the punch penetrates strip 19 and removes element 90 therefrom. In its continuing downward stroke, punch 43 uses element 90 as a punch to penetrate circuit board 29 at the registered receiving position and presses element 90 into the circuit board as shown in FIG. 24, thereby removing a scrap disk 89 from the board. The shape of cam surfaces 48a and the linkages to punch 43 are designed to stop the downward travel of the punch when the top end of the element 90 is approximately flush with the top surface of the circuit board. Thereafter, as the fourth and final step, FIG. 25, punch 43 is retracted upward to a position beyond the hole 19*f*, made in strip 19 by removal of element 90, so as to permit strip 19 to be advanced. The apparatus is then returned to the starting position, shown in FIG. 22, by retracting punch head 45, indexing strip 19 to the left, and moving circuit board 29 to a new receiving position.

As a variant of step four, punch head 45 may be retracted upward before the punch in a manner similar to step eight of the preferred method (FIG. 13), thereby moving strip 19 away from the circuit board while punch 43 is still holding element 90 in hole 29*a* so as to ensure a clean severance from element 90. In this event, the punch is retracted between steps four and one and prior to indexing strip 19 and registering board 29.

Peening may be provided by enabling arm 64 and rod 63 to provide a shiftable die 81 and extending the alternate method from four to seven steps. More specifically, following the fourth step shown in FIG. 25, a fifth step is added to shift die 81 laterally to the right, so that the flat top surface 81*b* thereof encloses hole 29*a* on the bottom side of the circuit board. This shifted position of die 81 is illustrated in FIG. 11 and by the phantom image of FIG. 5. In fact, FIG. 11 illustrates this alternate method fifth step with the exception that hole 19*f* in strip 19 would be aligned with the punch. In the sixth step, the punch is moved downward to peen element 90 against the anvil surface 81*b;* the positioning of the operative elements is similar to that shown in FIG. 12. The final and seventh step can then be similar to FIG. 13, in which event, punch 43 is retracted between step seven and one and prior to indexing strip 19 and registering board 29.

Figure 28:
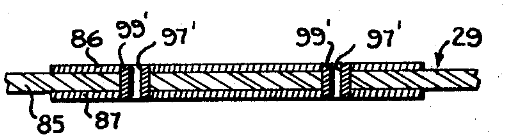
FIG. 28 is a sectional view of a printed circuit board having tubular elements inserted therein.
Figure 26:
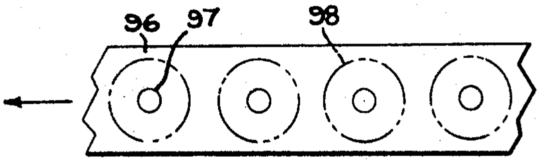
FIG. 26 is a fragmentary plan view of a prepunched conductive strip which may be used with the machine of FIG. 1.
Figure 27:
FIG. 27 is a sectional view of a printed circuit board having washer-shaped elements inserted therein.

For printed circuit applications requiring conductive through holes, or sleeves, a strip of conductive material 96 containing prepunched holes 97, each having a diameter less than the diameter of punch 43, is used in lieu of strip 19. Such a strip is illustrated in FIG. 26. In this case, strip 96 and indexing mechanism 23 are so aligned and adjusted as to progressively feed strip 96 during the strip index method step so that one of the prepunched holes 97 is coaxially aligned with punch 43. The dashed line circles 98 in FIG. 26 represent the relative positions of coaxially aligned punch 43 with respect to each of the holes 97 just prior to punching an element 99 from the strip 96 which includes that hole. As a result, the element 99 thereafter inserted in circuit board 29 is washer-shaped, as illustrated in FIG. 27, assuming a punch diameter much larger than strip thickness. If the thickness of strip 96 is greater than the punch diameter, a tubular shaped element 99' will result, as illustrated in FIG. 28.

Figure 29:
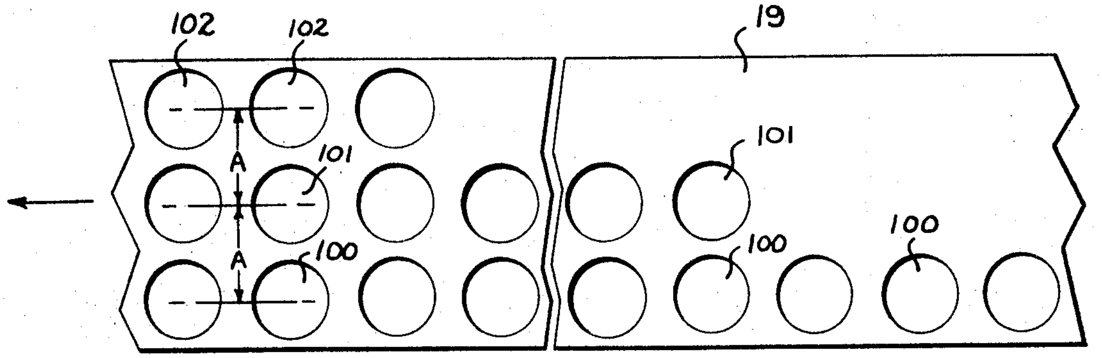
FIG. 29 is a fragmentary plan view of a conductive strip which has been perforated by the multiple head machine of FIG. 1.

When using a plurality of punches in cooperation with a single strip of conductive stock material, each punch is spaced apart and offset with respect to the others whereby holes punched in the strip by a preceding punch do not pass under succeeding punches as the stock material is indexed toward the succeeding punches. For example, FIG. 1 illustrates apparatus having three essentially identical cam actuated heads 11, 12 and 13 operating on a single strip 19. To enable each head to work on an unperforated portion of the strip, head 12 is spaced apart and set back from head 13, with reference to the strip center line. In like manner, head 11 is spaced apart and set back from head 12. AS a result, the axes of the punches in heads 11, 12 and 13 are respectively offset, with reference to the strip center line, so as to produce offset rows of holes in strip 19 as illustrated in FIG. 29. More specifically, as strip 19 advances to the left, the row of holes 100 are punched out by head 13; the row of holes 101 are produced by head 12; and the holes 102 are made by head 11. In one embodiment of the invention employing a plurality of heads equipped with 0.016 inch diameter punches, the offset A between punch centers was 0.024 inch.

What is claimed is:

1. The method of inserting an electrically conductive element into an electrically insulating material in a manner to provide exposed surfaces of said element on two sides of said insulating material comprising the steps of: registering said insulating material in a predetermined receiving position; positioning an electrically conductive stock material, having a preformed hole therein, with respect to said insulating material; using said preformed hole as a guide for a punch positioned at said predetermined receiving position; actuating said punch through said preformed hole to penetrate said insulating material and form an aperture therein; retracting said punch to a position beyond said preformed hole; indexing said stock material to displace said preformed hole from under said punch; and actuating said punch to penetrate said stock material, removing therefrom said electrically conductive element and depositing said element in said aperture.

2. The method of claim 1 including the further step of positioning an anvil to enclose said aperture on the side of said insulating material opposite that facing said punch, and wherein said step of actuating the punch to penetrate said stock material is operative during the same stroke to cause said punch to press and peen said element into said aperture and against said anvil.

3. The method of claim 2 including the further steps of: moving said stock material away from said insulating material after peening said element and while said punch is still holding said element in said aperture; and retracting said punch away from said peened element subsequent to commencement of said step of moving said stock material away from said insulating material.

4. The method set forth in claim 1 including the further step of positioning an upset die in alignment with said aperture on the side of said insulating material opposite that facing said punch, and wherein said step of actuating the punch to penetrate said stock material is operative during the same stroke to cause said punch to press and peen said element into said aperture and against said upset die, whereupon said upset die functions to deform the adjacent end of said element to better secure said element in said insulating material.

* * * * *